(12) United States Patent
Yano et al.

(10) Patent No.: US 10,063,843 B2
(45) Date of Patent: Aug. 28, 2018

(54) IMAGE PROCESSING APPARATUS AND IMAGE PROCESSING METHOD FOR ESTIMATING THREE-DIMENSIONAL POSITION OF OBJECT IN IMAGE

(71) Applicant: CANON KABUSHIKI KAISHA, Tokyo (JP)

(72) Inventors: Kotaro Yano, Tokyo (JP); Hiroyuki Uchiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 15/261,601

(22) Filed: Sep. 9, 2016

(65) Prior Publication Data

US 2017/0076454 A1 Mar. 16, 2017

(30) Foreign Application Priority Data

Sep. 15, 2015 (JP) ................................ 2015-181897

(51) Int. Cl.
*H04N 13/02* (2006.01)
*G06T 7/73* (2017.01)
(Continued)

(52) U.S. Cl.
CPC ..... *H04N 13/0282* (2013.01); *G06K 9/00342* (2013.01); *G06K 9/00355* (2013.01);
(Continued)

(58) Field of Classification Search
CPC combination set(s) only.
See application file for complete search history.

(56) References Cited

U.S. PATENT DOCUMENTS 5,561,526 A * 10/1996 Huber ................ G01B 11/2504
348/E13.005
6,031,941 A * 2/2000 Yano ....................... G06T 7/571
382/154
(Continued)

FOREIGN PATENT DOCUMENTS

JP 2008-84141 A 4/2008
JP 2009-143722 A 7/2009
(Continued)

OTHER PUBLICATIONS

Dalal and Triggs ; "Histograms of Oriented Gradients for HumanDetection". Proceedings of the IEEE Conference on Computer Vision and Pattern Recognition (2005); pp. 1-8.
(Continued)

*Primary Examiner* — Anand Bhatnagar
(74) *Attorney, Agent, or Firm* — Canon U.S.A., Inc. IP Division

(57) ABSTRACT

An image processing apparatus includes an association unit, a storage unit, a first estimation unit, and a second estimation unit. The association unit associates detection results of a first object and a second object. The storage unit stores a positional relationship between respective fields of view of a first image capturing unit and a second image capturing unit. The first estimation unit estimates a three-dimensional position of the first object based on the positional relationship and the first object detected in respective images captured by the first image capturing unit and the second image capturing unit. The second estimation unit estimates a three-dimensional position of the second object based on the three-dimensional position of the first object associated by the association unit.

20 Claims, 8 Drawing Sheets

(51) Int. Cl.
    *G06K 9/00*     (2006.01)
    *H04N 13/00*    (2018.01)
(52) U.S. Cl.
    CPC ........... *G06T 7/73* (2017.01); *H04N 13/0239* (2013.01); *G06T 2207/10021* (2013.01); *G06T 2207/30196* (2013.01); *G06T 2207/30232* (2013.01); *G06T 2207/30241* (2013.01); *H04N 2013/0085* (2013.01); *H04N 2013/0092* (2013.01)

(56) References Cited

U.S. PATENT DOCUMENTS

| | | | | |
|---|---|---|---|---|
| 6,611,283 | B1* | 8/2003 | Isonuma | H04N 13/0014 348/51 |
| 6,915,008 | B2* | 7/2005 | Barman | G01B 11/00 345/419 |
| 7,092,109 | B2* | 8/2006 | Satoh | G01B 11/00 348/139 |
| 7,945,152 | B2* | 5/2011 | Hirai | G03B 13/36 348/349 |
| 8,229,595 | B2* | 7/2012 | Seelinger | B25J 9/1697 700/245 |
| 8,638,989 | B2* | 1/2014 | Holz | G06K 9/3233 382/103 |
| 9,094,615 | B2* | 7/2015 | Aman | G01S 3/7864 |
| 9,779,546 | B2* | 10/2017 | Hunt | G06T 17/20 |
| 2004/0176925 | A1* | 9/2004 | Satoh | G01B 11/00 702/150 |
| 2008/0266386 | A1* | 10/2008 | Maeda | G06F 3/012 348/47 |
| 2010/0321492 | A1* | 12/2010 | Cornett | G06T 11/00 348/143 |
| 2012/0019485 | A1* | 1/2012 | Sato | G06F 3/017 345/175 |
| 2013/0215237 | A1* | 8/2013 | Inoue | H04N 13/025 348/49 |

FOREIGN PATENT DOCUMENTS

| | | |
|---|---|---|
| JP | 2010-67079 A | 3/2010 |
| JP | 2012-155391 A | 8/2012 |

OTHER PUBLICATIONS

"Three-dimensional Vision", Kyoritsu Shuppan, Co., Ltd., (1998); pp. 1-8.

* cited by examiner the embodiment. The image analysis apparatus 100 is con-
IMAGE PROCESSING APPARATUS AND IMAGE PROCESSING METHOD FOR ESTIMATING THREE-DIMENSIONAL POSITION OF OBJECT IN IMAGE

BACKGROUND OF THE INVENTION

Field of the Invention

Aspects of the present invention relate to an image processing apparatus and an image processing method, and particularly relates to an image processing apparatus and an image processing method for estimating a three-dimensional position of an object in an image captured by an image capturing apparatus.

Description of the Related Art

Recently, there has been a rapid spread of monitoring cameras installed in stores for security. There is a proposal to use such a monitoring camera for not only acquiring a video image, but also for using the video image for the purpose of a marketing research of a store by detecting a person in the video image to measure a level of congestion or to analyze a flow of the person. In addition, for the marketing purpose, there is a demand for analyzing the motion of a person caught by a monitoring camera in order to analyze, from the analyzed motion of the person, a behavior with interest such as picking up of a commodity in a store with the hand.

In a case where the motion analysis is performed, useful information cannot be obtained without a sufficient accuracy of detecting a region of a person. In Japanese Patent Laid-Open No. 2012-155391, a method is proposed in which a plurality of regions of a person in an image is detected to estimate an orientation of the person. However, there is a following situation: although a distinctive region such as a face is relatively easily detected, regions having a simple shape such as a torso and limbs cannot be detected accurately since it is difficult to distinguish the regions from other objects appearing in the background.

Regarding this situation, Japanese Patent Laid-Open No. 2008-84141 proposes a method in which the head and a hand of a person are detected in a three-dimensional image captured by a 3D camera to recognize the motion thereof.

In addition, in Japanese Patent Laid-Open No. 2010-67079, a method is proposed in which a person area included in a two-dimensional distance data is recognized to analyze a behavior of a person. The conventional examples described above perform three-dimensional recognition in order to improve the accuracy. However, an enormous amount of processes may be used for acquiring a range image.

Furthermore, as in Japanese Patent Laid-Open No. 2009-143722, a method is proposed in which a three-dimensional position of an individual person is estimated by a stereoscopic vision of the detected individual person. In this example, the three-dimensional position is estimated by integrating detection results of a head detected in images captured by a plurality of cameras, and thereby a movement locus of the person is analyzed. However, the motion of a person cannot be analyzed only by a position of the head of the person.

It is possible, by extending the above-described method, to integrate results of a plurality of regions detected in images captured by a plurality of cameras to estimate three-dimensional positions thereof and to perform a motion analysis. However, the regions for the motion analysis are to be captured by the plurality of cameras.

For example, when such an analysis process is performed by using a plurality of monitoring cameras installed in a store, it is easy to capture a region such as a head by the plurality of cameras. However, regions such as limbs are likely to be hidden, and therefore it has been difficult to estimate the three-dimensional positions thereof.

SUMMARY OF THE INVENTION

An aspect of the present invention is to detect a region of a person in an image captured by a plurality of image capturing apparatuses to estimate a three-dimensional position thereof even when the region to be detected is hidden.

According to an aspect of the present invention, an image analysis apparatus includes an image acquiring unit configured to acquire an image from a first image capturing unit and a second image capturing unit; a detection unit configured to detect a first object and a second object in the image; an association unit configured to associate detection results of the first object and the second object; a storage unit configured to store a positional relationship between respective fields of view of the first image capturing unit and the second image capturing unit; a first estimation unit configured to estimate a three-dimensional position of the first object based on the positional relationship and the first object detected in respective images captured by the first image capturing unit and the second image capturing unit; and a second estimation unit configured to estimate a three-dimensional position of the second object based on the three-dimensional position of the first object associated by the association unit.

Further features of aspects of the present invention will become apparent from the following description of exemplary embodiments (with reference to the attached drawings).

DESCRIPTION OF THE EMBODIMENTS

Hereinbelow, an embodiment according to an aspect of the present invention will be described with reference to the drawings.

Figure 8:
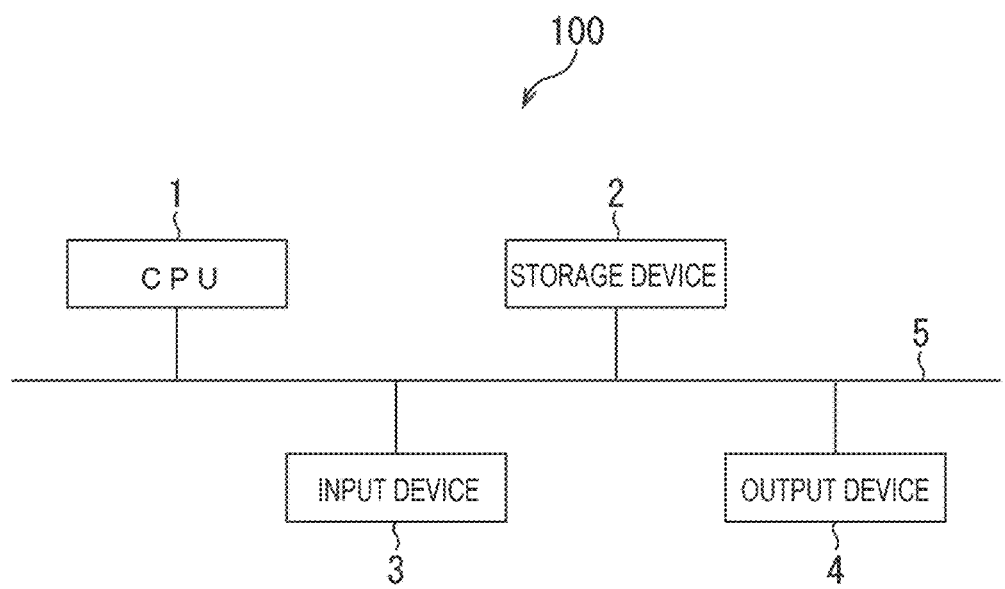
FIG. 8 is a block diagram illustrating a hardware configuration of the image analysis apparatus according to the embodiment.

FIG. 8 is a block diagram illustrating a hardware configuration of an image analysis apparatus 100 according to figured to include a central processing unit (CPU) 1, a storage device 2, an input device 3, and an output device 4. Each of the devices is configured to be able to communicate with each other and is connected through a bus 5 or the like.

The CPU 1 controls an operation of the image analysis apparatus 100 and performs, for example, execution of a program stored in the storage device 2.

The storage device 2 is a storage device such as a magnetic storage device or a semiconductor memory, and stores a program read based on an operation of the CPU 1, data to be stored for a long period of time, and the like. In the embodiment, each function in the image analysis apparatus 100 and processes according to flowcharts described later are realized by the CPU 1 executing processes in accordance with a procedure of the program stored in the storage device 2. The storage device 2 also stores an image and a detection result to be processed by the image analysis apparatus 100 according to the embodiment of the present invention.

The input device 3 is a mouse, a keyboard, a touch panel device, a button, or the like, and inputs various types of instructions. The input device 3 includes an image capturing apparatus such as a camera.

The output device 4 is a liquid crystal panel, an external monitor, or the like, and outputs various types of information.

The hardware configuration of the image analysis apparatus 100 is not limited to the configuration described above. For example, the image analysis apparatus 100 may include an I/O device for performing communication between various types of apparatuses. For example, the I/O device is an input/output unit such as a memory card and a USB cable, or a wired or wireless transmission/reception unit.

Figure 1:
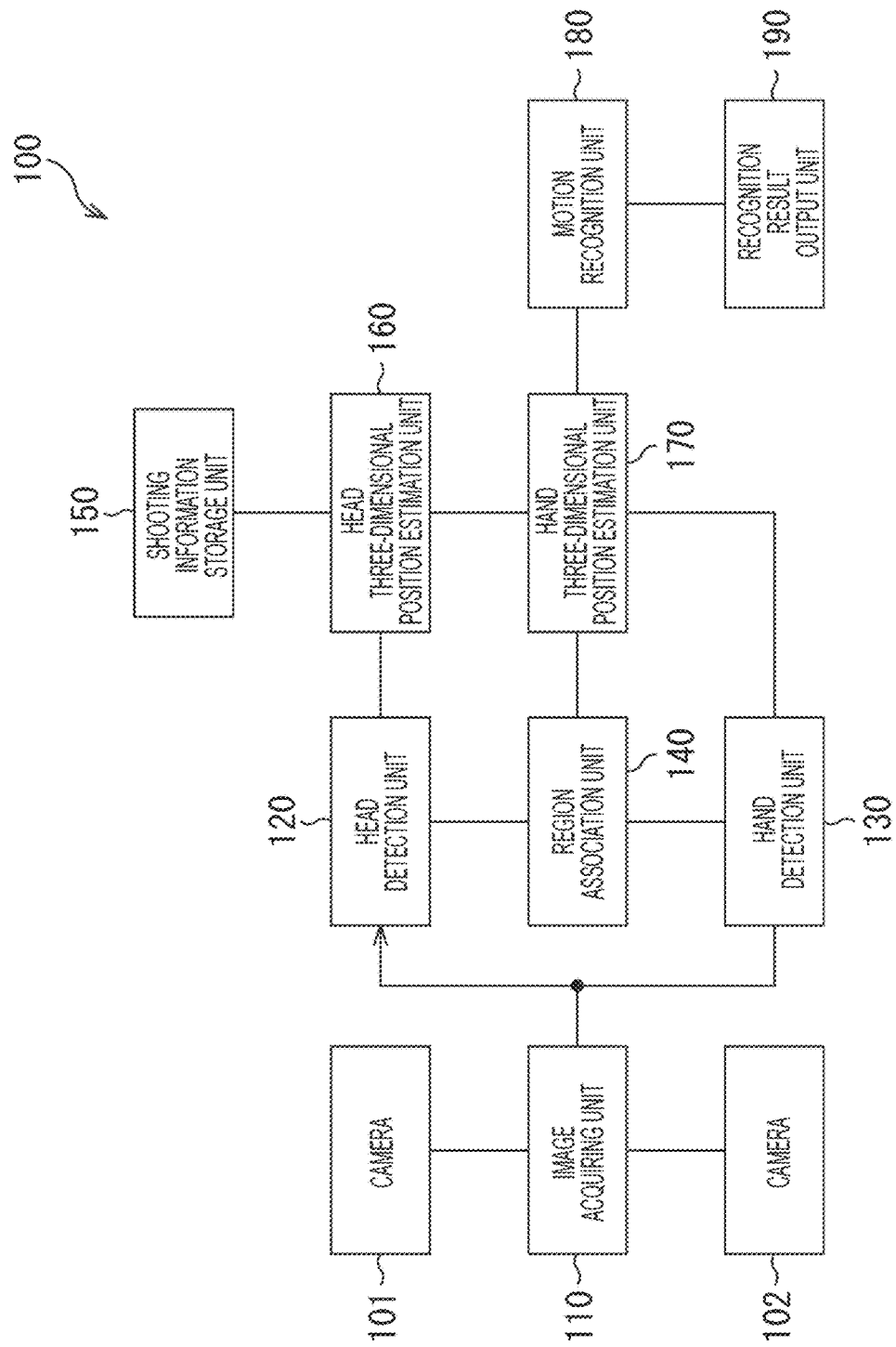
FIG. 1 is a block diagram illustrating a functional configuration of an image analysis apparatus according to an embodiment.

FIG. 1 is a block diagram illustrating a functional configuration of the image analysis apparatus 100 according to the embodiment. The processes and the functions of the image analysis apparatus 100 are realized by each unit illustrated in FIG. 1.

In the following embodiment, a description will be given for a case where a head and a hand of a person are detected as a first object and a second object, respectively, by a plurality of cameras, and respective three-dimensional positions thereof are estimated. It is assumed that a behavior with interest of a customer is analyzed from a video image captured by a monitoring camera installed in a store by recognizing, with the estimated three-dimensional position of the hand, motion such as picking up of an article with the hand.

A camera 101 and a camera 102 shoot a scene to be monitored. The cameras 101 and 102 function as a first image capturing unit and a second image capturing unit, respectively.

An image acquiring unit 110 acquires respective images captured by the cameras 101 and 102. The acquired images are stored in the storage device 2.

A head detection unit 120 and a hand detection unit 130 detect, in the images acquired by the image acquiring unit 110, the head and a hand of a person appearing in the images, respectively.

A region association unit 140 associates the head with the hand on a person by person basis, the head and the hand being detected by the head detection unit 120 and the hand detection unit 130, respectively.

A shooting information storage unit 150 stores shooting information of the cameras 101 and 102, for each camera. Here, the shooting information is information with which positional coordinates of an image captured by a camera and three-dimensional space coordinates of a scene to be shot are made to correspond to each other, and is determined based on a shooting magnification and a shooting direction of a camera. In addition, the shooting information includes information which indicates a geometric positional relationship between fields of view of respective images captured by the cameras 101 and 102.

A head three-dimensional position estimation unit 160 estimates positional coordinates of a head in a three-dimensional space by using a result detected by the head detection unit 120 in respective images captured by the cameras 101 and 102, and shooting information stored in the shooting information storage unit 150.

A hand three-dimensional position estimation unit 170 estimates positional coordinates of a hand in a three-dimensional space by using a result detected by the hand detection unit 130 in respective images captured by the cameras 101 and 102, and shooting information stored in the shooting information storage unit 150. In addition, the hand three-dimensional position estimation unit 170 estimates a three-dimensional position of the hand, by using a result of the association of the head and the hand by the region association unit 140, based on the three-dimensional position of the head obtained by the head three-dimensional position estimation unit 160 and a result detected by the hand detection unit 130.

A motion recognition unit 180 recognizes the motion of a hand based on time-series data of the three-dimensional position of the hand obtained by the hand three-dimensional position estimation unit 170.

A recognition result output unit 190 displays a result of the recognition by the motion recognition unit 180 on the output device 4.

Figure 2:
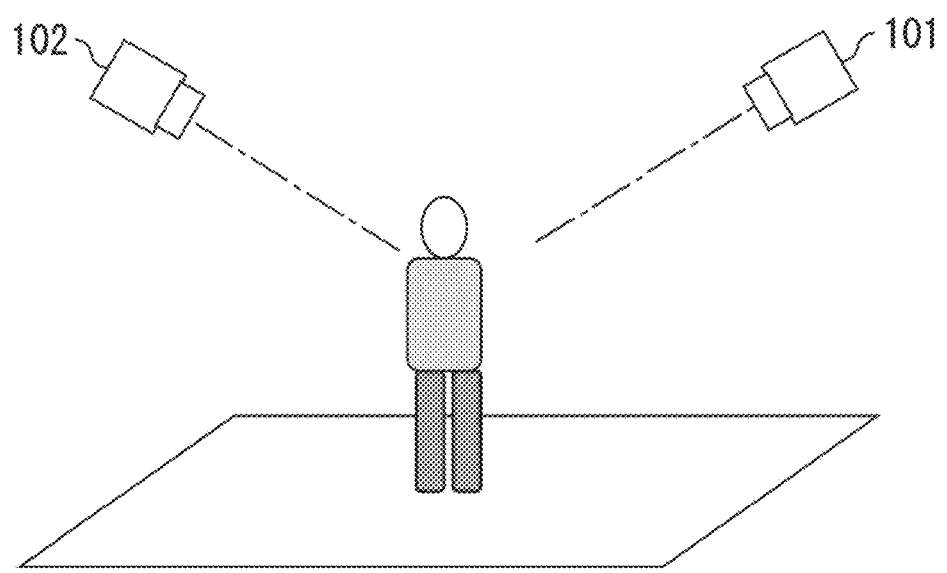
FIG. 2 is a drawing for explaining a shooting scene.

Hereinbelow, an operation of the embodiment will be described. As illustrated in FIG. 2, the cameras 101 and 102 are disposed so as to share a field of view with respect to a shooting scene, and it is assumed in the following description that the field of view with respect to a scene to be shot is fixed and shooting information remains unchanged.

Figure 3:
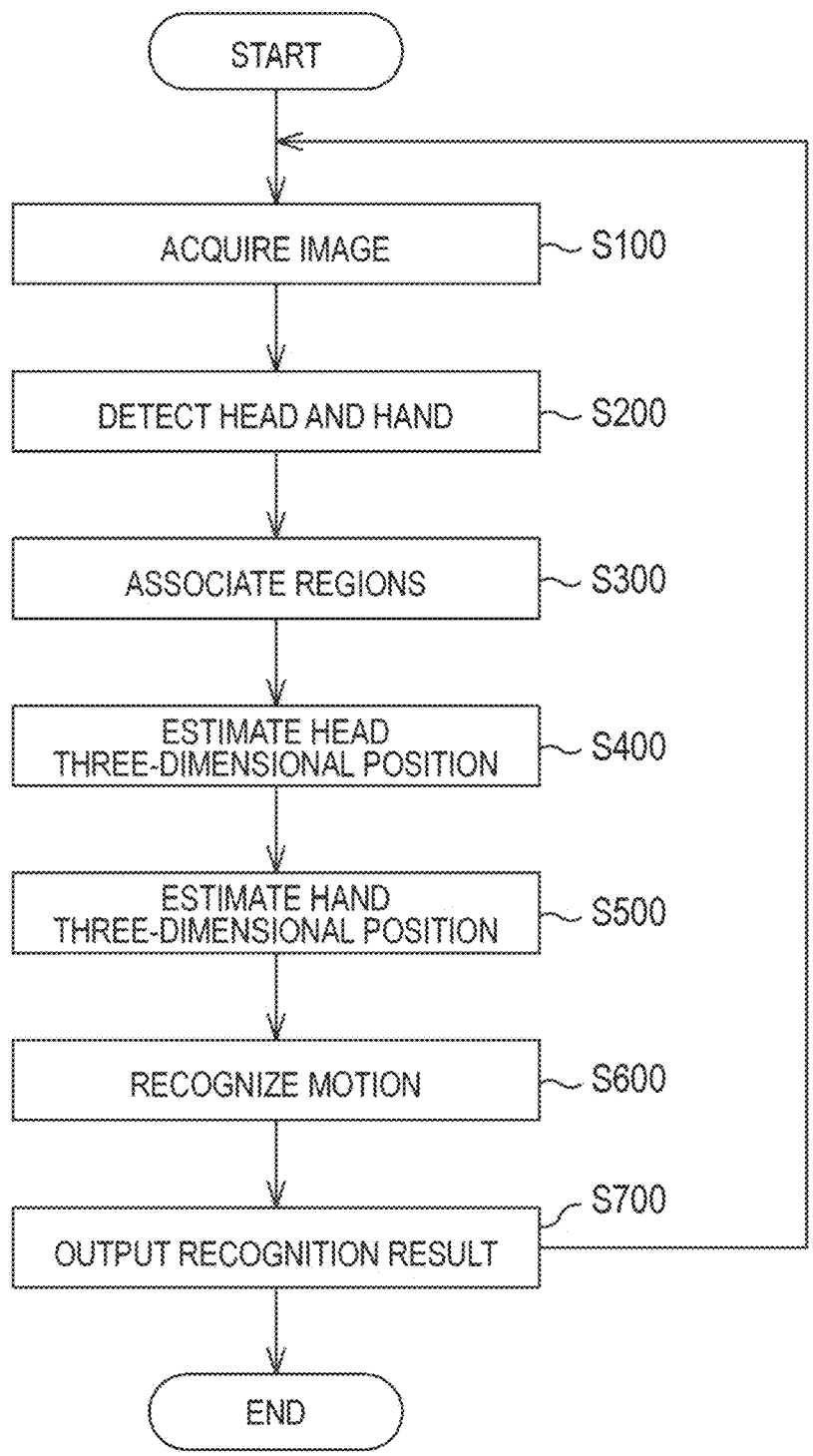
FIG. 3 is a flowchart illustrating a flow of a process performed by the image analysis apparatus according to the embodiment.

A flow of an analysis process performed by the image analysis apparatus 100 according to the embodiment is schematically illustrated in the flowchart in FIG. 3.

First, in S100, the image acquiring unit 110 acquires respective images captured by the cameras 101 and 102. Here, the images to be acquired are, for example, bitmapped data expressed by RGB with 8 bits each. Two images in synchronization such that the shooting times thereof coincide are to be acquired. Each of the acquired images is stored in the storage device 2. In the following description, an image acquired from the camera 101 is referred to as a first image, and an image acquired from the camera 102 is referred to as a second image.

Next, in S200, the head detection unit 120 and the hand detection unit 130 detect, in the first and the second images, the head and a hand of a person appearing in the images, respectively. In the embodiment, as a method for detecting a head and a hand in an image, a method for detecting humans as a whole is employed, which method is described in Dalal and Triggs. Histograms of Oriented Gradients for Human Detection. Proceedings of the IEEE Conference on Computer Vision and Pattern Recognition (2005). However, models for respectively distinguishing a head and a hand instead of a human as a whole are established in advance by preliminary learning, and applied to an input image.

In the above-described literature, whether it is a person is identified by using a model in which features of histograms of oriented gradients are extracted from an image, and values of the extracted features are learned by a support vector machine. However, other methods may be used. For example, regarding the values of the extracted features, there is no limitation to the features of histograms of oriented gradients, and a Haar-like feature, a local binary pattern histogram (LBPH) feature, or a combination thereof may be used. The extracted feature values are shared for the purpose of detecting a head and a hand.

In addition, other than the support vector machine, an AdaBoost classifier, a randomized tree, or the like may be used for a human identification model. A model of a head and a model of a hand are separately learned, and applied for detection of the head and the hand, respectively.

Here, detection results of the head and the hand are output as positional coordinates of four vertexes representing rectangles which surround a head and a hand in an image, respectively. Together with the positional coordinates, a label indicating a detected region and likelihood are output. The label indicating a detected region indicates the head or the hand. The likelihood is a result of collation between the extracted feature values and a head identification model or a hand identification model, and indicates the degree of coincidence with the models.

Next, in S300, the region association unit 140 associates the head with the hand on a person by person basis, the head and the hand being detected by the head detection unit 120 and the hand detection unit 130, respectively. Hereinbelow, details of the process will be described using the drawings.

Figure 4A:
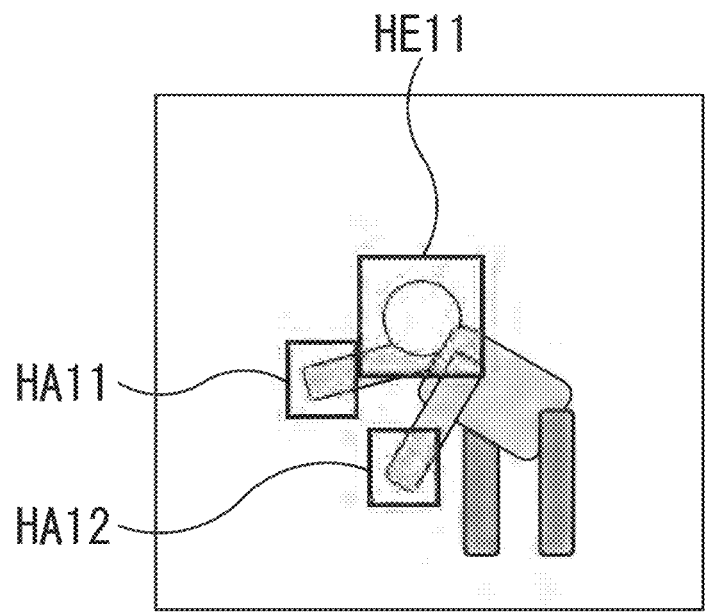
FIGS. 4A and 4B are views each illustrating an example of an image captured by a camera.
Figure 4B:
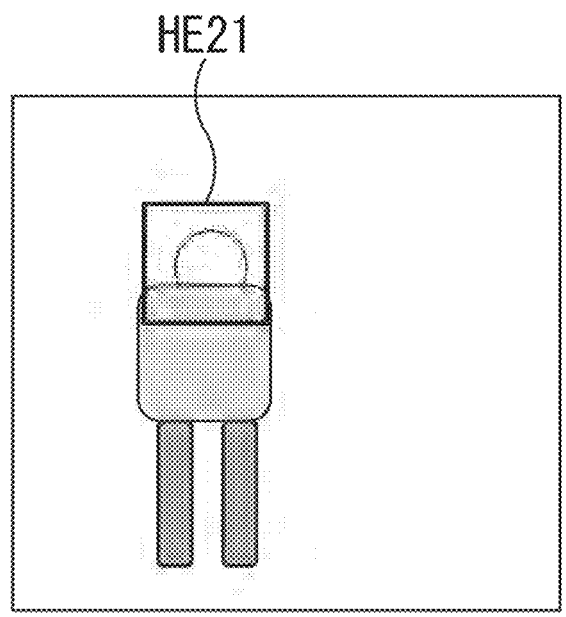

FIGS. 4A and 4B illustrate an example of respective images captured by the cameras 101 and 102. In the example, the camera 101 captures a person from a side, and both the head and the hands of the person are visible.

In FIG. 4A, HE 11 denotes a rectangle frame indicating a detection result of the head, and HA 11 and HA 12 denote rectangle frames indicating detection results of the hands. On the other hand, the camera 102 captures the person from behind, and the head is visible but the hands are hidden.

In FIG. 4B, HE 21 denotes a rectangle frame indicating a detection result of the head. As illustrated in the drawings, when attempting to analyze the motion of a person by monitoring cameras installed on the ceiling of a store or the like, although the head of the person can be captured by a plurality of cameras, it is often the case that the hands are hidden in images captured by some cameras.

Figure 5:
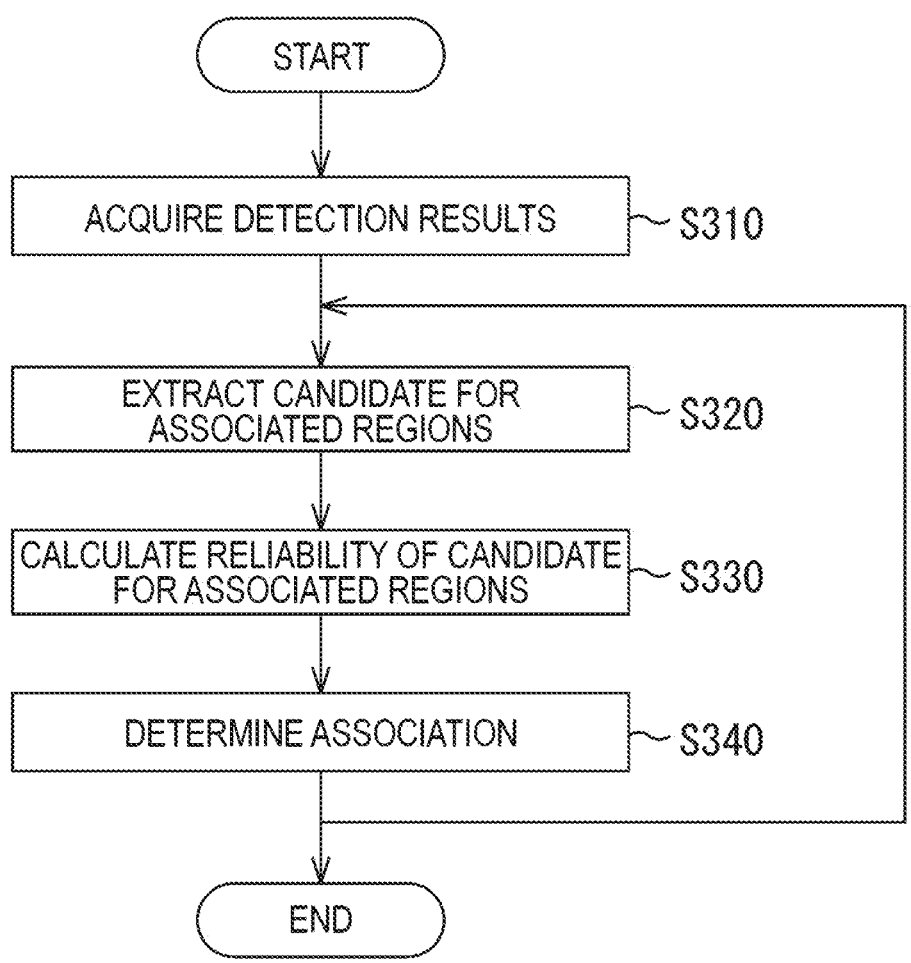
FIG. 5 is a flowchart illustrating a flow of a process performed by a region association unit.

FIG. 5 illustrates a flow of a process performed by the region association unit 140.

First, in S310, the region association unit 140 acquires detection results of the head and the hand detected by the head detection unit 120 and the hand detection unit 130, respectively.

The following processes in S320 to S340 are repeated with respect to, among the acquired detection results, a result of which the label indicates a hand. In the case illustrated in FIGS. 4A and 4B, the processes are performed to HA 11 and HA 12.

Next, in S320, for one hand detection result, a head detected in the same image is extracted as a candidate for associated regions. For example, in an example of the first image illustrated in FIG. 4A, a set of the hand detection result HA 11 and a result HE 11 of which the label indicates a head is extracted as a candidate for associated regions. Although one set is extracted as a candidate for associated regions in this example, a plurality of sets are extracted as candidates when a plurality of heads are extracted from the image. Moreover, to narrow, by using the positional coordinates of each detection result, the candidates only to sets of which the hand detection result and the head detection result exist within a predetermined distance.

Next, in S330, the region association unit 140 calculates reliability of the candidate for associated regions by using the positional coordinates and likelihood of each detection result. Regarding the candidate including a set of the hand detection result HA 11 and the head detection result HE 11, the centers of the rectangle frames are obtained from the positional coordinates thereof, respectively, and a displacement vector is calculated. In addition, areas of the rectangle frames of the hand and the head are obtained and an area ratio is calculated. The displacement vector and the area ratio thus obtained are collated with a model indicating a geometric relationship between a hand and the head of a person (hereinafter referred to as a human geometric model), and thereby obtaining geometric reliability.

Here, the human geometric model is a probability model. A number of samples of human images are collected in advance to obtain a statistic of a positional relationship between heads and hands in the samples, and based on the statistic, the probability model is acquired. The obtained geometric reliability and the likelihood of each of the hand detection result HA 11 and the head detection result HE 11 are integrated to obtain general reliability. Here, as a process for the integration, for example, a process is used with which the geometric reliability and the likelihood are linearly combined with a predetermined weight.

Next, in S340, the region association unit 140 determines the association of the hand detection result and the head detection result based on the obtained reliability of the candidate for associated regions. In other words, the region association unit 140 compares the reliability obtained in S330 with a predetermined value, and when the reliability is the predetermined value or more, the region association unit 140 associates the hand detection result with the head detection result, as regions of the same person.

Also with regard to the hand detection result HA 12, the processes in S320 to S340 are repeated similarly. The same processes are repeated for the second image. However, in the example illustrated in FIG. 4B, a hand is not detected in the second image, and therefore, the processes are not performed.

Next, in S400, the head three-dimensional position estimation unit 160 estimates positional coordinates of the head in a three-dimensional space, from head detection results detected in the first image and the second image, by using the shooting information stored in the shooting information storage unit 150.

Figure 6:
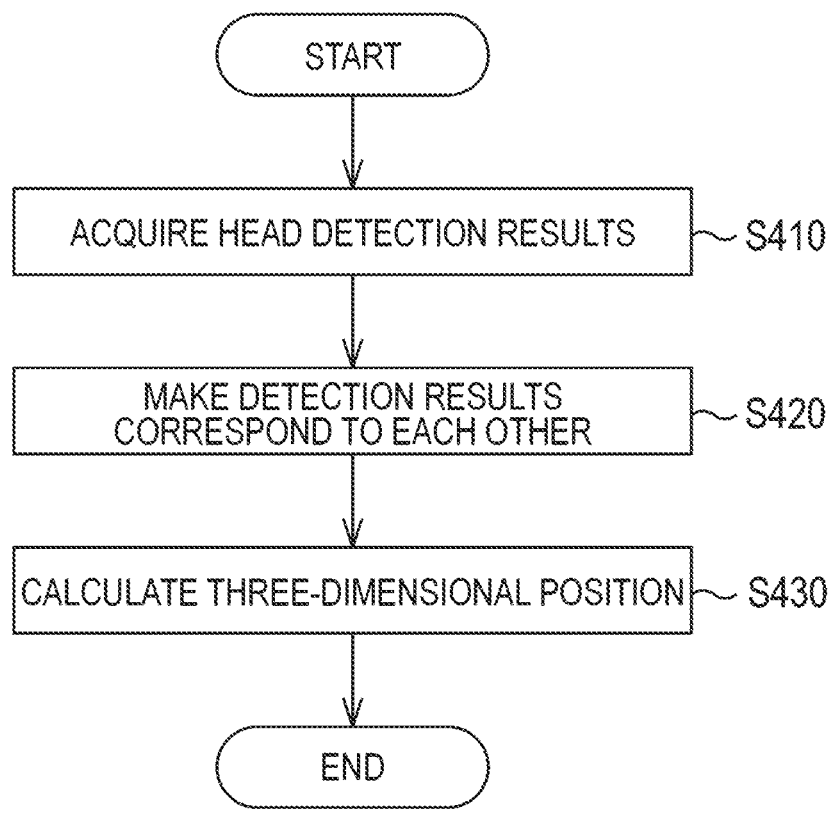
FIG. 6 is a flowchart illustrating a flow of a process performed by a head three-dimensional position estimation unit.

FIG. 6 illustrates a flow of a process performed by the head three-dimensional position estimation unit 160.

In S410, the head three-dimensional position estimation unit 160 acquires head detection results detected by the head detection unit 120.

Next, in S420, the head three-dimensional position estimation unit 160 makes the acquired head detection results correspond to each other between two images by using the shooting information stored in the shooting information storage unit 150.

The shooting information used here is a fundamental matrix indicating a geometric relationship between images captured by the cameras 101 and 102, and makes the head detection results in the images captured by the respective cameras correspond to each other by epipolar geometry.

First, coordinates of a head representative point are obtained from the positional coordinates of the head detection result in the first image captured by the camera 101.

The head representative point is, for example, a central point of a head rectangle frame. The coordinates of the head representative point are projected by a fundamental matrix, and an epipolar line in the second image is obtained. A distance between the obtained epipolar line and the coordinates of a representative point of a head detection result in the second image is calculated, and a detection result of which the distance is less than a predetermined value is a detection result to be corresponded.

In a case of the example in FIGS. 4A and 4B, it is determined based on the distance to the epipolar line whether the head detection result HE 21 detected in the second image corresponds to the head detection result HE 11 detected in the first image.

In a case where the distance exceeds the predetermined value, it means that there is no correspondence, in other words, the heads detected in the two images are not a region of the same person.

Hereinbelow, a description will be given assuming that HE 11 and HE 21 have been made to correspond to each other as a region of the same person. In a case where a plurality of results corresponds to one head detection result, the results are narrowed to one result using another measure. For example, consistency of a relationship of sizes of detected heads between the cameras, similarity of the images, and the like are used. In a case where there is a plurality of head detection results in the first image, correspondence is performed for all detection results. For details of the estimation of the epipolar line and the correspondence using the shooting information, see Gang Xu and Saburo Tsuji, "Three-dimensional Vision", Kyoritsu Shuppan, Co., Ltd., (1998).

Next, in S430, the head three-dimensional position estimation unit 160 calculates a three-dimensional position of the set of the heads made to correspond to each other in S420.

First, a straight line in a three-dimensional space, which passes through the representative point of the head detection result in the first image and the center of the camera 101, is obtained by using the shooting information of the camera 101 stored in the shooting information storage unit 150.

Similarly, a straight line in a three-dimensional space, which passes through the representative point of the corresponding head detection result in the second image and the center of the camera 102, is obtained by using the shooting information of the camera 102 stored in the shooting information storage unit 150. Then, an intersection of the two obtained straight lines is calculated, and defined as a three-dimensional position of the head. However, there occurs an error in calculation accuracy actually, and therefore, a midpoint of points on each straight line at a position where a distance between the two straight lines is minimum is defined as the three-dimensional position.

In the manner as described above, the head three-dimensional position estimation unit 160 performs a first three-dimensional position estimation process for estimating a three-dimensional position of the head as the first object.

Next, in S500, the hand three-dimensional position estimation unit 170 estimates positional coordinates of the hand in a three-dimensional space, from a hand detection result detected in the first image and the second image, by using the shooting information stored in the shooting information storage unit 150.

Figure 7:
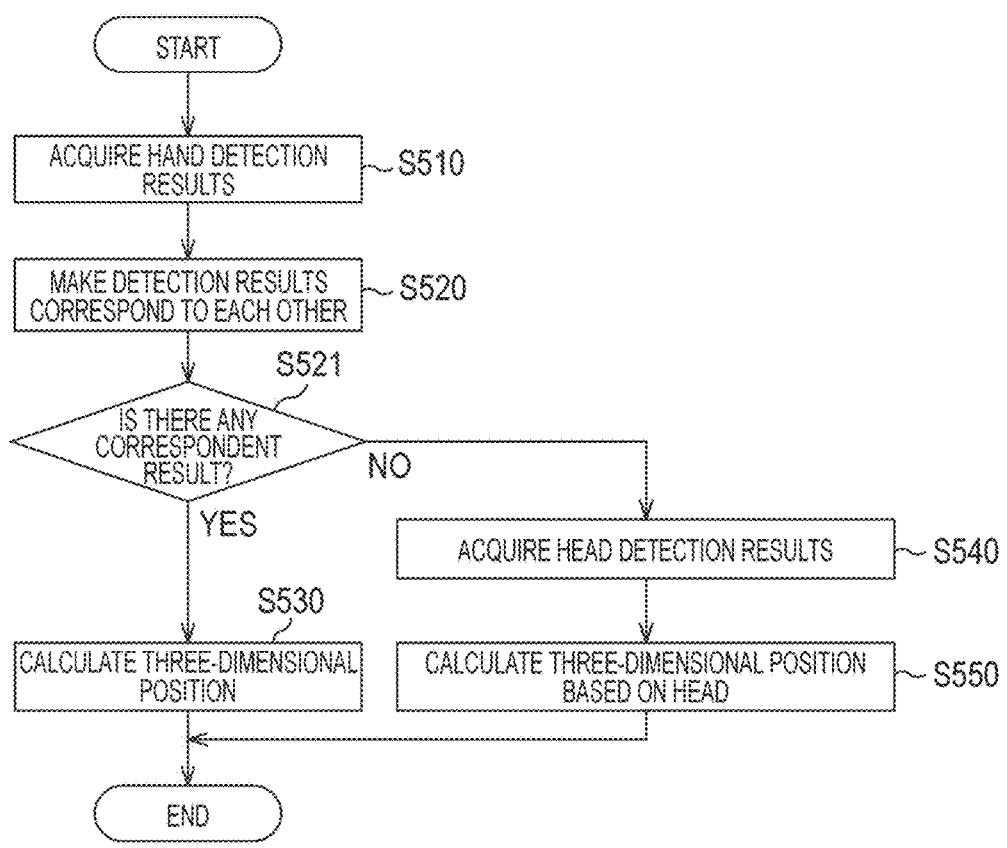
FIG. 7 is a flowchart illustrating a flow of a process performed by a hand three-dimensional position estimation unit.

FIG. 7 illustrates a flow of a process performed by the hand three-dimensional position estimation unit 170.

First, in S510, the hand three-dimensional position estimation unit 170 acquires detection results of the hand detected by the hand detection unit 130.

Next, in S520, the hand three-dimensional position estimation unit 170 makes the obtained hand detection results correspond to each other between two images by using the shooting information stored in the shooting information storage unit 150. Since the process in this step is performed in the same manner as in S420, which is the correspondence process by the head three-dimensional position estimation unit 160, a description thereof will be omitted.

In S521, the hand three-dimensional position estimation unit 170 determines whether the hand detection results acquired in S510 have been made to correspond to each other between the two images.

In S530, the hand three-dimensional position estimation unit 170 performs a three-dimensional position calculation process for a set including results which have been made to correspond to each other as a result of the determination in S521.

Since the process in S530 is performed in the same manner as in S430, which is the three-dimensional position calculation process by the head three-dimensional position estimation unit 160, a description thereof will be omitted.

On the other hand, regarding hand detection results (in the example in FIGS. 4A and 4B, HA 11 and HA 12) which have not been made to correspond to other results between the cameras as a result of the determination in S521, the process is moved to S540.

In S540, the hand three-dimensional position estimation unit 170 acquires the head detection result associated by the region association unit 140 with respect to the hand detection results which have not been made to correspond to other results between the cameras. In the example in FIGS. 4A and 4B, HE 11 is acquired for each of HA 11 and HA 12.

Next, in S550, the hand three-dimensional position estimation unit 170 calculates three-dimensional positions of the detected hands based on the acquired head detection result and the three-dimensional position thereof. On that occasion, since the hands and the head are associated with each other as regions of the same person, it is assumed that the hands and the head have substantially the same distance from the camera.

First, a straight line in a three-dimensional space, which passes through the representative point of the hand detection result and the center of the camera, is obtained by using the shooting information of the camera stored in the shooting information storage unit 150. Then, a point on the obtained straight line, which has the same depth as that of the three-dimensional position of the head detection result obtained in S400 is defined as a position in a three-dimensional space. For example, in the example in FIGS. 4A and 4B, a position of a point on a straight line in a three-dimensional space, which passes through the hand detection result HA 11 and the center of the camera 101, the point having the same depth as that of the head detection result HE 11, is obtained. A three-dimensional position of the hand detection result HA 12 is obtained in the same manner.

In the manner as described above, the hand three-dimensional position estimation unit 170 performs a second three-dimensional position estimation process for estimating a three-dimensional position of the hand of the person as the second object, from a three-dimensional position of the head of the person as the first object associated by the region association unit 140.

The same process is performed for a hand detected in the second image. In the example in FIGS. 4A and 4B, a hand is not detected in the second image, and therefore, the process is skipped.

Next, in S600, the motion recognition unit 180 recognizes motion of the hand from the time-series data of the three-dimensional position of the hand obtained by the hand three-dimensional position estimation unit 170. In other words, a movement locus of the hand is obtained from sequentially acquired three-dimensional positions of the hand at a plurality of time points. For example, when recognizing the motion of picking up a commodity in a store with the hand, a movement locus is obtained by referring to preset spatial coordinates of a store shelf, and it is determined based on the obtained movement locus whether the hand has moved closer to the store shelf and then has moved away from the store shelf. In addition, it is possible to recognize the commodity which the person has reached for when preparing spatial coordinates of commodities on the store shelf according to the types thereof and referring to the spatial coordinates.

Next, in S700, the recognition result output unit 190 displays a result of the recognition by the motion recognition unit 180 on the output device 4. For example, a detection frame of the hand is superimposed on the image captured by the camera such that the recognition result can be observed.

In the example in FIGS. 4A and 4B, a frame represented by HA 11 is displayed on the first image in which a hand appears. Alternatively, a result such as "motion of picking up an article with the hand is detected" is displayed in characters outside the frame of the camera image. In addition, the number of the results detected by the motion recognition unit 180 may be displayed for each motion to be recognized.

The steps S100 to S700 described above are repeatedly performed for images captured by the cameras 101 and 102.

In the above embodiment, all detection results of the head and the hand are associated as a candidate for associated regions in the region association unit 140. However, the association may be performed only for detection results of which three-dimensional positions cannot be estimated through correspondence of detection results in images captured by the respective cameras. In that case, the three-dimensional positions of the head and the hand are estimated respectively in advance through correspondence of the detection results in images captured by the respective cameras, and a candidate for associated regions of region association may be extracted from the result thereof.

In addition, in the above embodiment, images are captured by two cameras so as to overlap the fields of view, and motion is analyzed from the images. However, three or more cameras may be used for the process. In addition, in the above embodiment, the head and a hand of a person are detected to recognize the motion of picking up an article with the hand. However, an object to be detected may be other region of a person.

Furthermore, on that occasion, the three-dimensional position of the hand is estimated from the three-dimensional position of the head. However, in a case where the head is caught by only one of the cameras, the three-dimensional position of the head can be estimated from the three-dimensional position of the hand. Aspects of the present invention can be applied to an object other than a person when detecting a plurality of objects for which some kind of association can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-181897, filed Sep. 15, 2015, which is hereby incorporated by reference herein in its entirety.

What is claimed is:

1. An image processing apparatus comprising:
   one or more processors; and
   a memory coupled to the one or more processors, the memory having stored thereon instructions which, when executed by the one or more processors, cause the apparatus to:
   acquire an image from a first image capturing unit and a second image capturing unit;
   detect a first object and a second object in the image;
   associate detection results of the first object and the second object;
   store a positional relationship between respective fields of view of the first image capturing unit and the second image capturing unit;
   estimate a three-dimensional position of the first object based on the positional relationship and the first object detected in respective images captured by the first image capturing unit and the second image capturing unit; and
   estimate a three-dimensional position of the second object based on the three-dimensional position of the associated first object.

2. The image processing apparatus according to claim 1, further comprising determine whether the second object has been detected in the respective images acquired from the first image capturing unit and the second image capturing unit, wherein
   the estimate estimates the three-dimensional position of the second object in a case where the second object has not been detected in the image acquired from at least one of the first image capturing unit and the second image capturing unit.

3. The image processing apparatus according to claim 2, wherein the associate associates the detection results of the first object and the second object in a case where the second object has not been detected in the image acquired from at least one of the first image capturing unit and the second image capturing unit.

4. The image processing apparatus according to claim 1, further comprising recognize motion of the second object from the three-dimensional positions of the second object at a plurality of time points.

5. The image processing apparatus according to claim 1, wherein the first object and the second object are different regions of one object.

6. The image processing apparatus according to claim 5, wherein the first object and the second object are regions of a person.

7. The image processing apparatus according to claim 6, wherein the first object is a head of the person and the second object is a hand of the person.

8. The image processing apparatus according to claim 7, further comprising recognize motion of the hand of the person from the three-dimensional positions of the second object at a plurality of time points.

9. The image processing apparatus according to claim 8, wherein the motion of the hand of the person is motion of the person picking up an article with the hand.

10. The image processing apparatus according to claim 1, wherein the associate associates detection results of the first object and the second object based on respective detection positions.

11. The image processing apparatus according to claim 1, wherein the associate associates detection results of the first object and the second object based on respective degrees of likelihood.

12. The image processing apparatus according to claim 1, wherein the estimate estimates a distance to the second object from a distance to the first object.

13. An image processing method, comprising:
   acquiring an image from a first image capturing unit and a second image capturing unit;
   detecting a first object and a second object in the image;
   associating detection results of the first object and the second object;
   estimating a three-dimensional position of the first object based on the positional relationship between respective fields of view of the first image capturing unit and the second image capturing unit and the first object detected in respective images captured by the first image capturing unit and the second image capturing unit; and
   estimating a three-dimensional position of the second object based on the three-dimensional position of the first object associated in the associating.

14. The image processing method according to claim 13, further comprising:
   determining whether the second object has been detected in the respective images acquired from the first image capturing unit and the second image capturing unit; and
   estimating the three-dimensional position of the second object in a case where the second object has not been detected in the image acquired from at least one of the first image capturing unit and the second image capturing unit.

15. The image processing method according to claim 13, further comprising recognizing motion of the second object from the three-dimensional positions of the second object at a plurality of time points.

16. The image processing method according to claim 13, wherein the first object and the second object are different regions of one object.

17. A non-transitory storage medium having stored therein a program causing a computer to execute each step of an image processing method, the method comprising:
   acquiring an image from a first image capturing unit and a second image capturing unit;
   detecting a first object and a second object in the image;
   associating detection results of the first object and the second object;
   estimating a three-dimensional position of the first object based on the positional relationship between respective fields of view of the first image capturing unit and the second image capturing unit and the first object detected in respective images captured by the first image capturing unit and the second image capturing unit; and
   estimating a three-dimensional position of the second object based on the three-dimensional position of the first object associated in the associating.

18. The non-transitory storage medium according to claim 17, further comprising:
   determining whether the second object has been detected in the respective images acquired from the first image capturing unit and the second image capturing unit; and
   estimating the three-dimensional position of the second object in a case where the second object has not been detected in the image acquired from at least one of the first image capturing unit and the second image capturing unit.

19. The non-transitory storage medium according to claim 17, further comprising recognizing motion of the second object from the three-dimensional positions of the second object at a plurality of time points.

20. The non-transitory storage medium according to claim 17, wherein the first object and the second object are different regions of one object.

* * * * *